US005162905A

United States Patent [19]

Itoh et al.

[11] Patent Number: 5,162,905

[45] Date of Patent: Nov. 10, 1992

[54] AUTOMATIC COMMERCIAL MESSAGE RECOGNITION AND MONITORING DEVICE

[75] Inventors: Yosikazu Itoh; Hidetoshi Ichige; Tadayuki Aoyama, all of Tokyo, Japan

[73] Assignee: K. K. Video Research, Tokyo, Japan

[21] Appl. No.: 677,054

[22] Filed: Mar. 29, 1991

[30] Foreign Application Priority Data

Apr. 6, 1990 [JP] Japan .................................. 2-91445

[51] Int. Cl.$^5$ ......................... H04N 7/00; H04N 7/10

[52] U.S. Cl. .......................................... 358/84; 455/2

[58] Field of Search ............... 358/142, 143, 144, 908, 358/108, 185, 84, 86; 455/2, 67

[56] References Cited

U.S. PATENT DOCUMENTS

| | | | |
|---|---|---|---|
| 3,919,479 | 11/1975 | Moon et al. | 381/42 |
| 4,230,990 | 10/1980 | Lert, Jr. et al. | 455/67 |
| 4,677,466 | 6/1987 | Lert, Jr. et al. | 358/84 |
| 4,739,398 | 4/1988 | Thomas et al. | 358/84 |
| 5,019,899 | 5/1991 | Boles et al. | 358/84 |

*Primary Examiner*—James J. Groody
*Assistant Examiner*—Safet Metjahic
*Attorney, Agent, or Firm*—Sughrue, Mion, Zinn, Macpeak & Seas

[57] ABSTRACT

An automatic commercial message (CM) recognition device has an audio data preparing portion (6) for producing audio data from an audio signal contained in a TV program received, a silence data preparing portion (7) for producing silence data from the audio signal contained in the TV program received, an image change detector portion (8) for detecting a change of image on an image screen from a video signal of the TV program received, a control portion (12) for determining a start or an end of a CM when an output of the silence data detecting portion indicates a silence state and the image change detector portion detects a change of an image, and a CM data referencing portion (14) for deriving an audio data from the start or end of the CM and comparing it with a preliminarily stored audio data of the CM.

6 Claims, 7 Drawing Sheets

AUTOMATIC COMMERCIAL MESSAGE RECOGNITION AND MONITORING DEVICE

BACKGROUND OF THE INVENTION

The present invention relates to a device for automatically recognizing a commercial message (referred to as "CM" hereinafter) broadcast as requested.

CM are widely utilized in TV broadcasting as an advertising medium. Enterprises act as sponsors for TV programs and spend large amounts of money to prepare and broadcast CMs.

It has been known, however, that TV broadcasting companies must rely upon a large number of employees and use very complicated devices to realize a broadcasting. For these reasons, TV programs are not always broadcast as scheduled and CMs are not always actually broadcast at a time and with the content requested by a sponsor, which is a very serious problem for the sponsor.

In order to solve this problem, there is a business field in which it is checked whether or not a required broadcasting is actually performed.

In this business field, the checking of necessary items is usually done human eyes and ears. That is, watchers view a plurality of TV monitors located within a service area of TV broadcasting, each monitor being set for a different channel, while recording broadcasting programs by a corresponding number of video tape recorders to fix the contents of the broadcast programs, which are collected subsequently to find any error.

This has drawbacks in that the number of watchers required is considerable and in that, since such watchers are human beings, human error may degrade the reliability of the monitoring in many ways.

SUMMARY OF THE INVENTION

The present invention is intended to solve these drawbacks of the conventional monitoring business and therefore an object of the present invention is to provide an automatic CM recognition device capable of automatically checking any error in broadcasting time or content of a specific CM, with high reliability.

The above object can be achieved, according to the present invention, by an automatic CM recognition device which comprises:

an audio data preparing portion for producing audio data from an audio signal contained in a TV program received;

a silence data preparing portion for producing silence data from the audio signal contained in the TV program received;

an image change detector portion for detecting a change of image on an image screen from a video signal of the TV program received;

a control portion for determining a start or an end of a CM when an output silence data of the silence data detecting portion indicates a silence state and the image change detector portion detects a change of image; and a CM data referencing portion for deriving an audio data from the start or end of the CM and comparing it with a preliminarily stored audio data of the CM.

It has been found by the inventors of this invention that, with respect to signals contained in a CM program, i.e., the audio signal and the video signal, the carrier frequency of the audio signal is not modulated at the start or end of a CM broadcast for a time interval of several hundred milliseconds and the video signal is sharply changed by a switching of the signal source during such interval. The present invention is based on a detection of such change of signal states to derive only the CM program by a video recorder while referencing the audio data with an audio counterpart of a known and stored CM data.

In the present automatic CM recognition device, the audio data preparing portion produces audio data from a received audio signal in a TV broadcasting signal, the silence data preparing portion produces silence data from the audio signal contained in the TV program received, the image change detector portion detects a change of image on an image screen from a video signal of the TV program received, the control portion determines a start or end of a CM when output silence data of the silence data detecting portion indicates a silence state and the image change detector portion detects a change of image, and the CM data referencing portion derives audio data from a start or end of the CM and compares it with preliminarily stored audio data of the CM.

DETAILED DESCRIPTION OF THE PREFERRED EMBODIMENTS

An embodiment of the present invention will be described with reference to the accompanying drawings.

Figure 1:
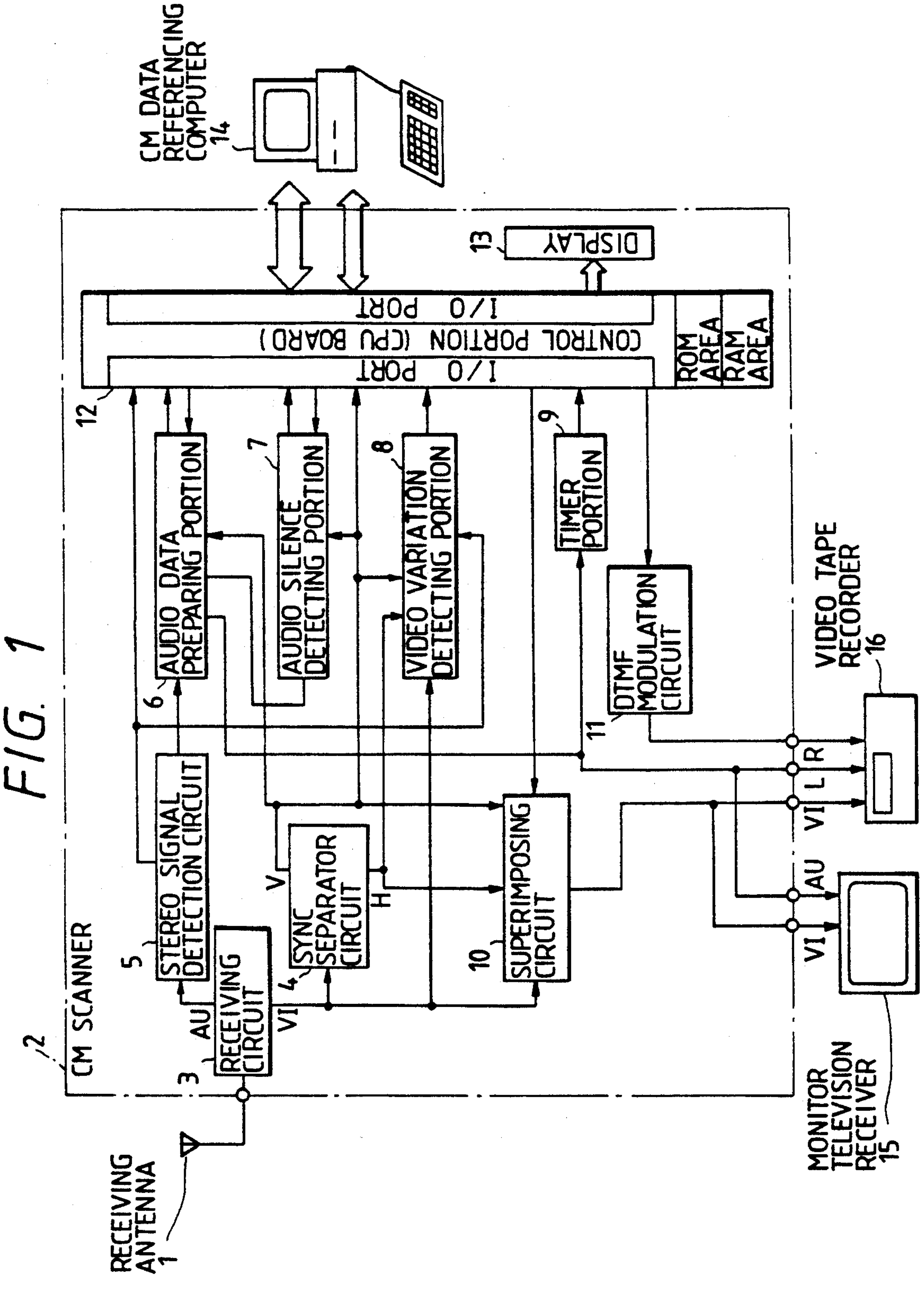
FIG. 1 shows a circuit construction of an embodiment of an automatic CM recognition device according to the present invention.

In FIG. 1 which shows a construction of an embodiment of an automatic CM recognition device according to the present invention, the device is constituted mainly by a receiving antenna 1, a CM processor 2, a CM data referencing computer 14, a monitor television receiver 15 and a video tape recorder 16. The CM processor 2 serves to receive TV broadcasting, to detect a start and an end of a CM and output an audio signal contained in the CM as an audio data by digitizing the audio signal in synchronism with a vertical synchronizing signal. The CM data referencing computer 14 serves to derive the CM detected by the CM processor 2 for a period from the start to the end thereof compare audio data received from the CM processor 2 during the CM period with an audio data (master data) stored for the known CM, and record the content thereof and the broadcasting time thereof. On the other hand, the video tape recorder 16 is used to manually check the CM when the CM can not be analysed by the computer 14 or to provide material for preparation of new master data.

In FIG. 1, the CM processor 2 comprises a receiver circuit 3, a sync separator circuit 4, a stereo signal detection circuit 5, an audio data preparing portion 6, an audio silence detection circuit 7, a video variation detecting portion 8, a timer portion 9, a superimposing circuit 10, a DTMF modulation circuit 11, a control portion (CPU board) 12 and a display 13. Details of constructions and operations of these components will be described.

(1) Preparation of Audio Data and Silence Data

A broadcasting wave received at the receiving antenna 1 is passed to the receiving circuit 3 in which an audio signal AU and a composite, video signal VI from a desired channel are derived. The receiving circuit 3 may comprise a tuner circuit, an intermediate frequency circuit and a detection circuit well known, all of which are in the art. The desired channel is fixed and a separate device, as shown in FIG. 1, is provided for each of such channels.

The video signal VI from the receiving circuit 3 is supplied to the sync separator circuit 4 from which a vertical synchronizing signal V and a horizontal synchronizing signal H are derived for use in other circuit components of this device.

The audio signal AU from the receiving circuit 3 is supplied to the stereo signal detection circuit 5 in which it is determined whether or not it is a stereo broadcasting according to presence or absence of an identifier signal. When this is a stereo broadcasting, it is signalled to the control portion 12, etc.

The audio signal passed through the stereo signal detection circuit 5 is supplied to the audio data preparing portion 6 in which digitized audio data of, for example, 8 bits is produced by sampling it with a timing of the vertical synchronizing signal V supplied from the sync separation circuit 4. The digital audio data is fetched by the control portion 12 in response to a signal therefrom. The audio data is used to specify the content of the CM. The audio signal is branched at the audio data preparing portion 6 and is supplied to the audio silence detection portion 7, in which silence data indicating a silent state is produced. The silence data is used to detect silent states, which are one of the important factors in detecting a start and an end of a CM.

Figure 2:
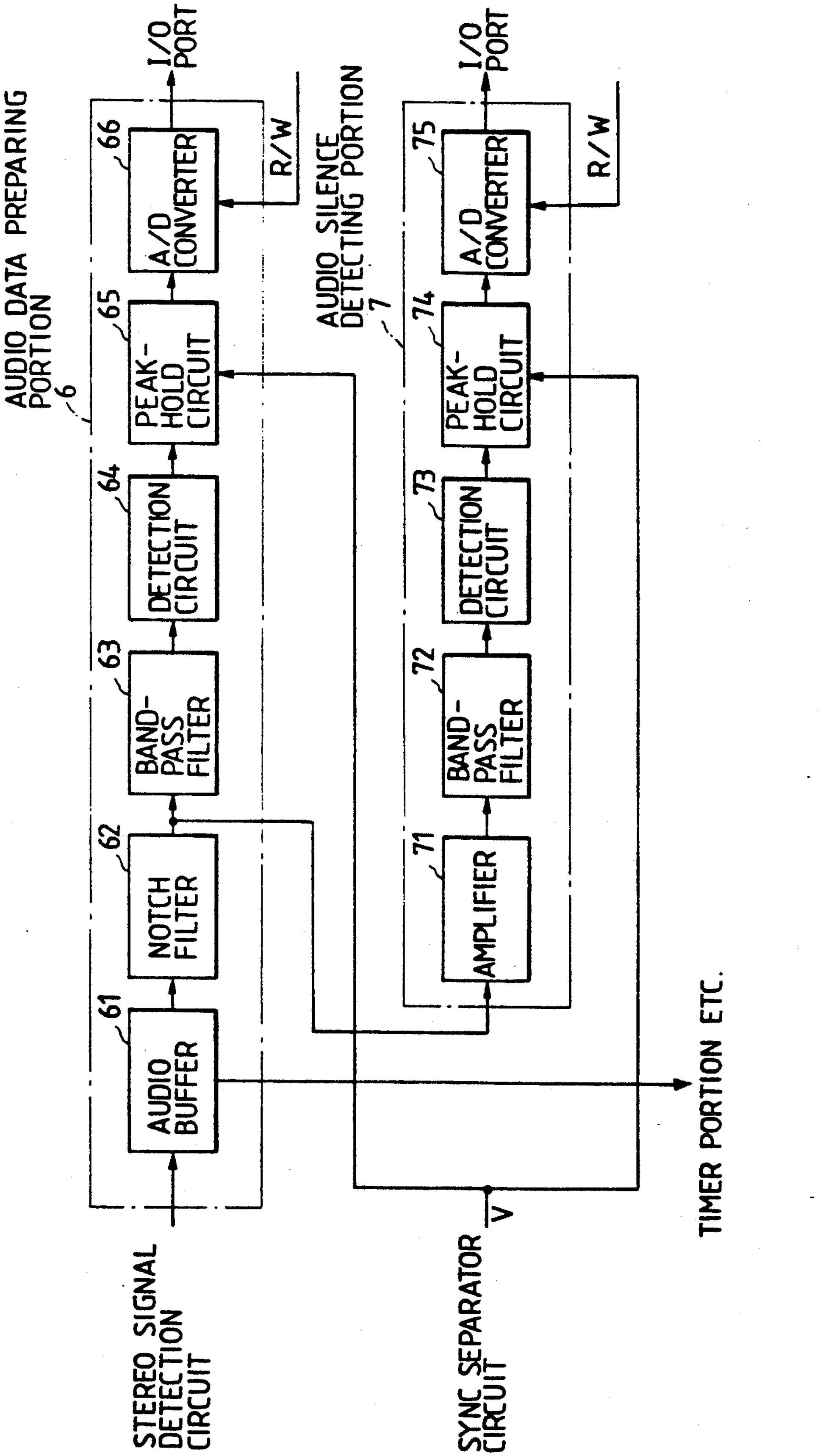
FIG. 2 shows an audio data preparing portion and a silence data detecting portion of the embodiment shown in FIG. 1.

FIG. 2 shows a circuit construction of the audio data preparing portion and the audio silence detecting portion 7. The audio data preparing portion 6 comprises an audio buffer 61, a notch filter 62, a band-pass filter 63, a detection circuit 64, a peak-hold circuit 65 and an A/D converter 66. The audio silence detecting portion 7 comprises an amplifier 71, a band-pass filter 72, a dection circuit 73, a peak-hold circuit 74 and an A/D converter 75. The audio signal is supplied to the audio silence detecting portion 7 from an output of the notch filter 62 of the audio data preparing portion 6.

In operation, the audio signal supplied to the audio data preparing portion 6 is buffered by the audio buffer 61 and then a frequency of timecasting signal (440 Hz, 880 Hz) is removed therefrom by the notch filter 62 so that such time cast can not affect the recognition of the CM.

Then, a frequency component, for example, 100 Hz to 1000 Hz, of the audio signal passed through the notch filter 62 is received by the band-pass filter 63. This frequency range is selected since it is sufficient for recognizing an identity of the CM from the audio signal and since a wider range might cause an erroneous determination to occur.

The audio signal, after being passed through the band-pass filter 63, is converted by a suitable time constant of the detection circuit 64 into a signal indicating maximum amplitude variation.

An output signal of the detection circuit 64 is sampled in the peak-hold circuit 65 at the timing of the vertical synchronizing signal V supplied from the sync separation circuit 4, and is converted by the subsequent A/D converter 66 into audio data of, for example, 8 bits and fetched by the control portion 12, according to a read/write signal R/W supplied from the control portion 12, through an I/0 port.

The audio silence detecting portion 7 has a similar circuit construction to that of the audio data preparing portion 6 and therefore its operation is also similar, except that the passband of the band-pass filter 72 is set at 100 Hz to 5000 Hz so that a silence state can be detected, more precisely.

According to the Japanese TV broadcasting standard, 60 audio data and 60 silence data, each datum being 8 bits, are produced for a time period of 1 second and are received by the control portion 12.

(2) Detection of Video Signal Variation

In FIG. 1, the video signal VI from the receiving circuit 3 is supplied to the video signal variation detecting portion 8 which detects an abrupt and considerable change in the video signal and provides a signal indicating the same to the control portion 12.

Figure 3:
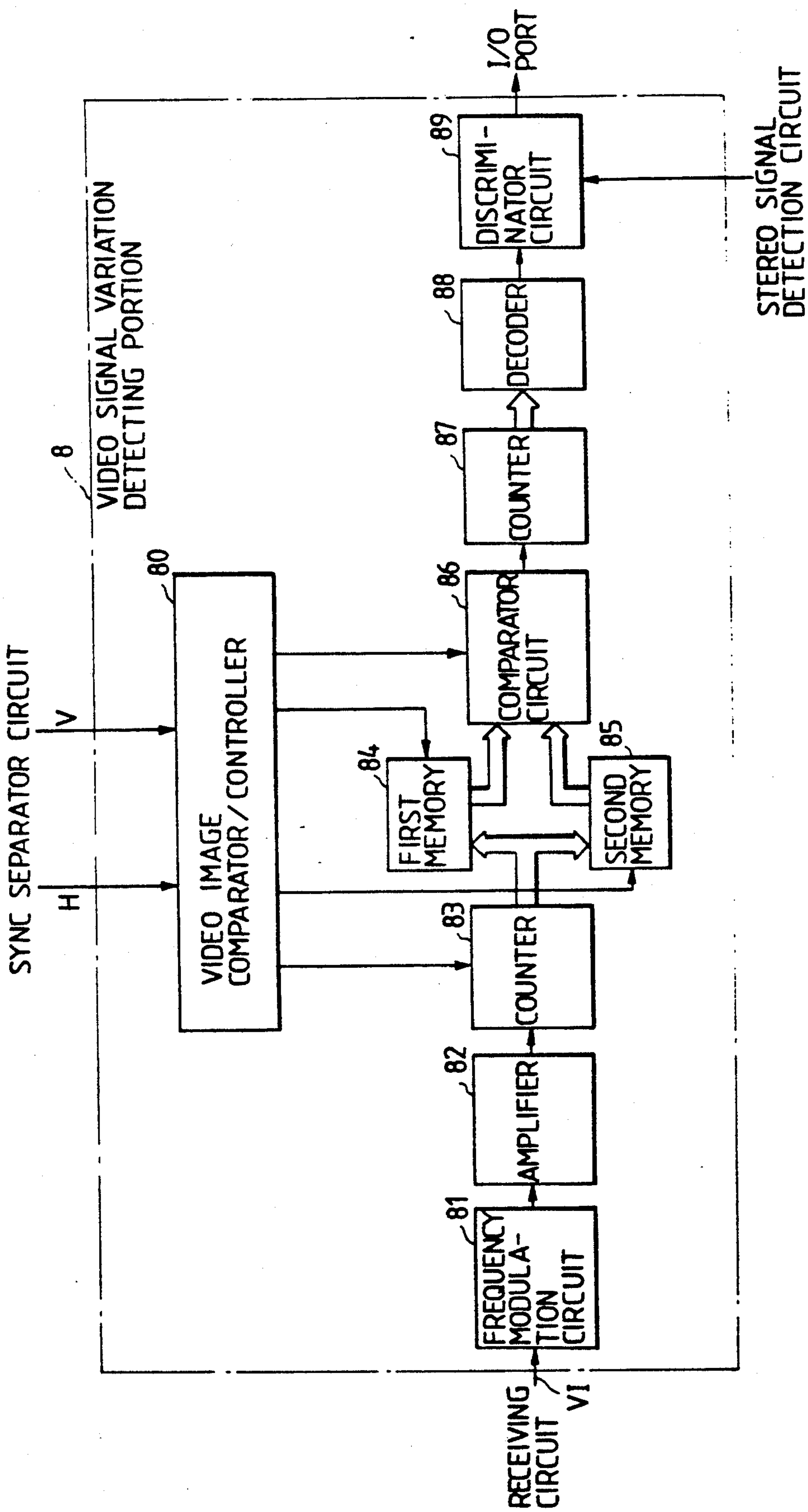
FIG. 3 shows a circuit construction of an image change detecting portion of the embodiment shown in FIG. 1.
Figure 4:
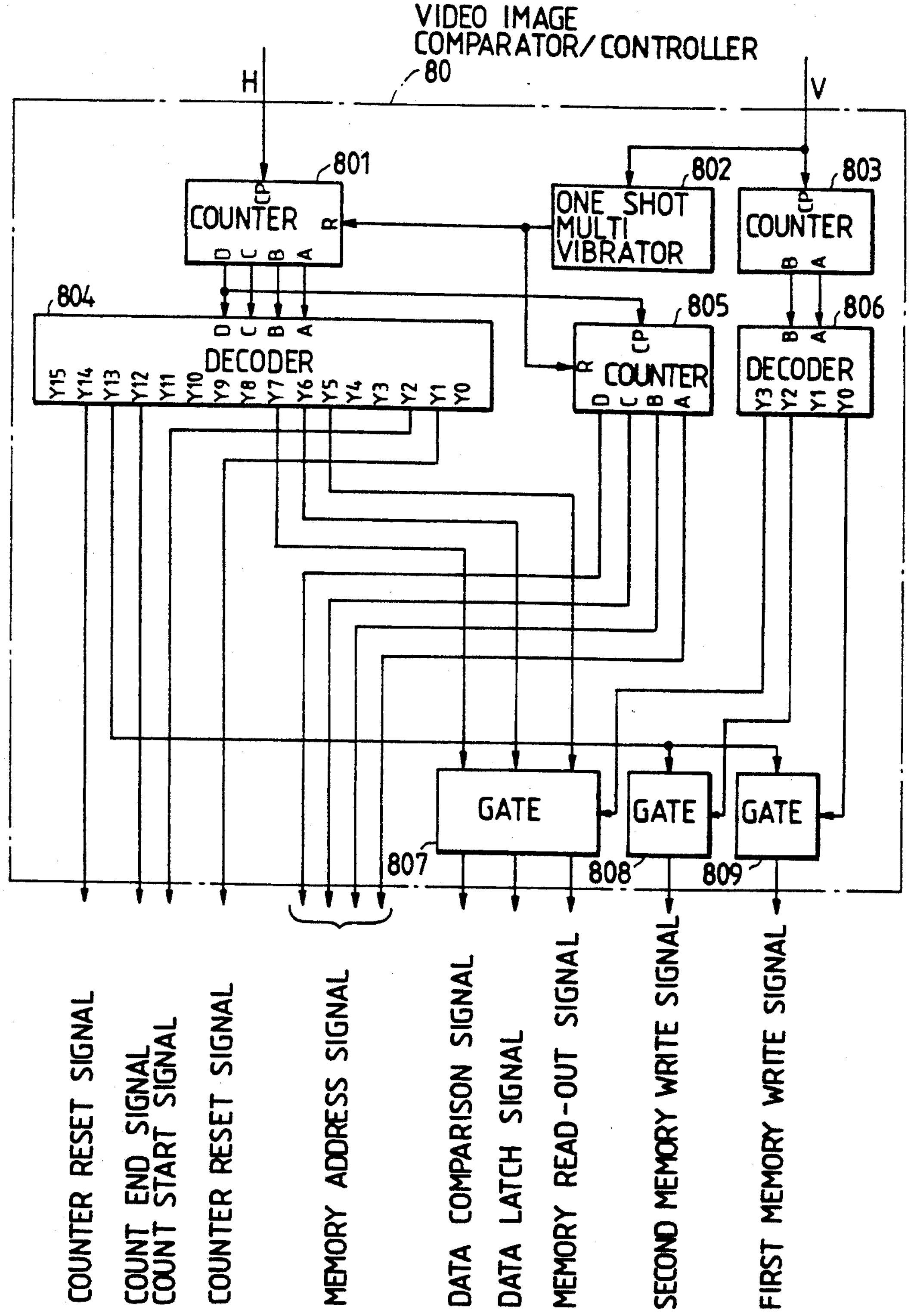
FIG. 4 shows a circuit construction of an image comparing/control circuit shown in FIG. 3.

FIG. 3 shows an internal construction of the video signal variation detecting portion 8. The video signal variation detecting portion 8 comprises a frequency modulation circuit 81, an amplifier 82, a counter 83, a first memory 84, a second memory 85, a comparator 86, a counter 87, a decoder 88, a discriminator circuit 89 and a video image comparator/controller 80. The latter comparator/controller 80 is shown in FIG. 4 in detail.

In operation, the video signal VI supplied from the receiving circuit 3 is frequency-modulated by the frequency modulation circuit 81. This frequency modulation is used to make a wave amplitude of the video signal constant to thereby facilitate a wave number counting of video signal. This counting is performed by the counter 83 so that any signal change can be reflected as an exact count value.

Then, after the frequency-modulated video signal is amplified to a suitable level by the amplifier 82, its wave number is counted by the counter 83 for a predetermined time period and the count value is written in the first memory 84 or the second memory 85.

In this embodiment, one detection cycle is constituted by 2 frames of a video signal (1 frame corresponding to 1 image and being constituted with an odd number field and an even number field). The change of image is detected by assigning the odd number field constituting a preceding half of one frame to a counting period and the even number field constituting a succeeding half of a next frame to a comparison period between counts of the former frame and the later frame. Each odd number field is divided by, for example, 16 (although the divisor in FIG. 4 is 16, it is not limited thereto) and the counting is performed for each of 16 periods. This is because, when the counting is performed for a time corresponding to a whole odd number field, there might be a case where a large change of image is cancelled out and can not be reflected by the count value.

Therefore, the counter 83 is reset at an end of each of the 16 periods and counts the number of waves fallen in a next period immediately succeeding the preceding period. The count values of the respective 16 periods are written in a first address to 16th address of the first memory, respectively, in sequence, and this is repeated for the odd number field of the next frame and the count values are written in 1st to 16th addresses of the second memory. respectively, in sequence.

Then, in the even number field of the second frame, the count values stored in the first memory 84 and the second memory 85 are read out from the first addresses thereof sequentially and compared sequentially with each other by the comparator circuit 86. Equality comparisons and non-equality comparisons are counted by the counter 87 and converted by the decoder 88 into signals indicative of the number of equalities and the number of non-equalities. From this, the discrimination circuit 89 determines the existence or absence of image change. The determination provided by the discrimination circuit 89 is supplied to the control portion 12. For example, when there are 8 or more non-equalities among 16 comparisons, this determines an existence of image change. Since stereo TV broadcasting is popular in Japan and therefore any CM tends to be broadcast in stereo mode, the stereo signal detection circuit 5 is provided so that a reference value in determining image change can be changed according to the broadcasting mode, monaural or stereo.

As shown in FIG. 4, in order to control the counting, the writing to and reading from the memories, and the comparisons, a signal discriminating between odd number fields and even number fields of two successive frames is produced based on the vertical synchronizing signal V by a 2-bit counter 803 and a decoder 806. Also, various control signals are produced within each of the 16 periods of 1 field based on the horizontal synchronizing signal H by means of a 4-bit counter 801 and a decoder 804. Write and read signals and comparison signals are defined by periods given by gates 807 to 809. Memory address signals for the first and second memories 84 and 85 are produced from signals from the most significant bit D of the counter 801 through a 4-bit counter 805.

(3) Detection of Start or End of CM

In FIG. 1, the control portion 12 monitors silence data from the audio silence detecting portion 7 and determines a silent state when data indicative of a silent state persists for, for example, 250 ms.

When the silence data from the audio silence detecting portion 7 indicates a silent state and the video change detecting portion 8 detects a switching between images, it is determined as a start or end of a CM which is signalled to the CM data referencing computer 14.

(4) Pick-up of CM and Reference of Audio Data

Upon receipt of detection signal of start or end of a CM from the CM processor 2, an internal soft timer (not shown) of the CM data referencing computer 14 measures a CM time (using the vertical synchronizing signal V as a reference) and, when the CM time measured is in the order of 10 seconds, 15 seconds, 30 seconds, 45 seconds or 60 seconds, it is decided that the CM is ended. The audio data produced by the audio data preparing portion is read out from the CM processor 2 starting at the end point of CM in reverse direction to the start point thereof.

The audio data thus read out is referenced with respect to master data which includes audio data of known CMs preliminarily stored on a magnetic disk, etc., and, when there is any equality found between the readout data and the master data, the name of the sponsor thereof, the name of the product and the broadcasting time, etc., are recorded and concurrently outputted to a monitor of the CM data referencing computer 14. Where there is no equality between the readout data and the master data, a message indicating that fact is recorded and outputted for subsequent use in preparing new master data.

(5) Adjustment of Time

Figure 5:
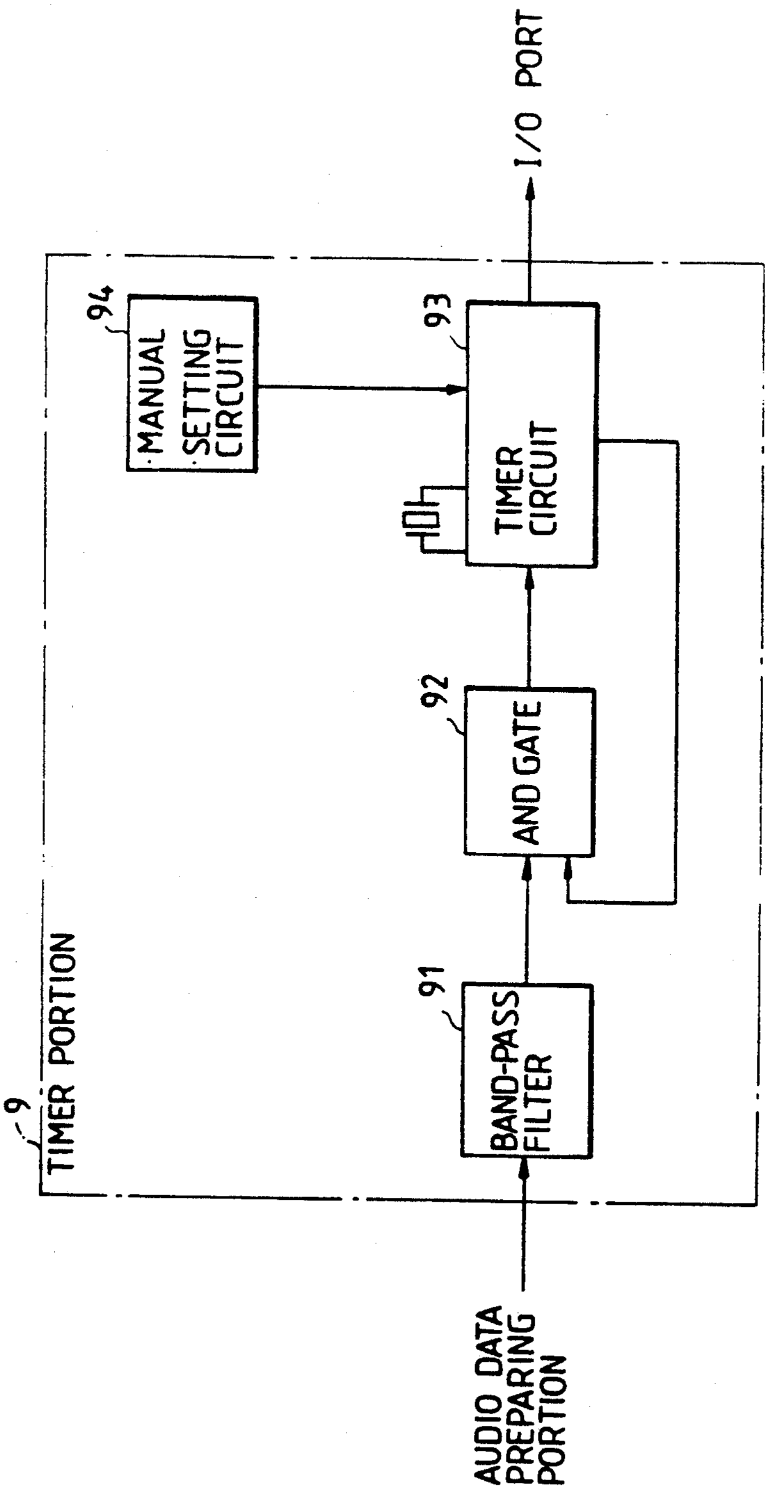
FIG. 5 shows a construction of a timing portion shown in FIG. 1.

FIG. 5 shows an internal construction of the timer portion 9 shown in FIG. 1.

The timer portion 9 is constituted mainly by a timer circuit 93 comprising a quartz oscillator. Further, the timer portion 9 includes a manual setting circuit 94 for arbitrarily setting time (month, day, hour, minute and second), a band-pass filter 91 and an AND gate 92.

The audio signal from the audio buffer 61 of the audio data preparing portion 6 shown in FIG. 2 is supplied to the band-pass filter 91 by which the timecast signal (880 Hz) contained in the audio signal is derived. The timecast signal is ANDed with an adjusting signal supplied from the timer circuit 93 by the AND gate 92 to automatically adjust the timer circuit. The adjusting signal from the timer circuit 93 may be a signal which, when the timer circuit 93 is to be corrected by a timecast signal of noon, is active for a time period from a time instance of AM 11 o'clock, 59 minutes, 58 seconds to PM 0 o'clock, 0 minutes, 2 seconds, taking an error of the timer circuit 93 into consideration.

(6) Preparation of Monitor Signal and Recording Signal

Figure 6:
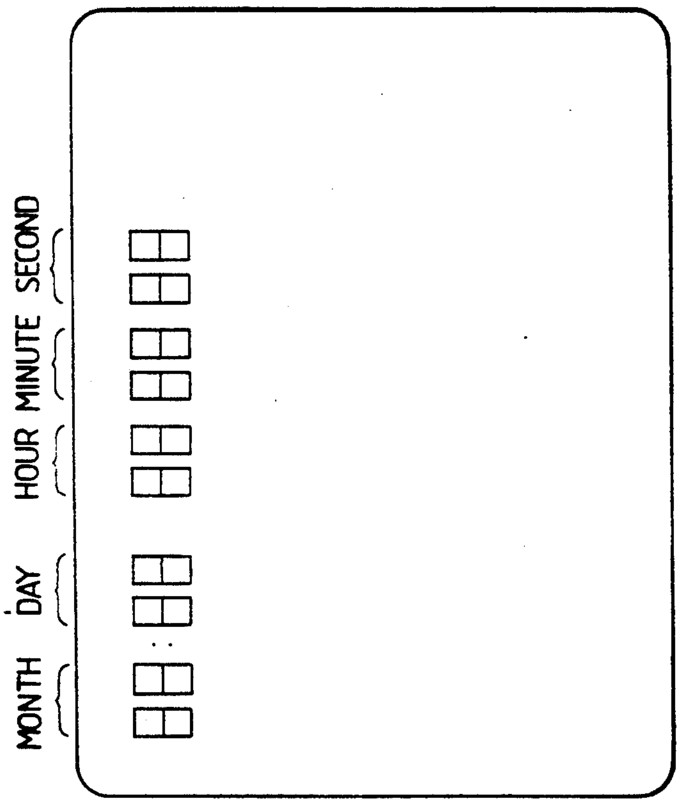
FIG. 6 illustrates an example of superimposition.

In FIG. 1, the video signal VI from the receiving circuit 3 is also supplied to the superimposing circuit 10 in which a character image including time indication supplied from the control portion 12 is superimposed on the video signal VI and an output of the superimpose circuit 10 is displayed on the monitor TV 15 and simultaneously recorded by the video tape recorder 16. FIG. 6 illustrates an example of time to be superimposed on a video image. With such superposition of time, etc., it is possible to identify a specific date and time to recognize a recorded content manually subsequently.

Figure 7:
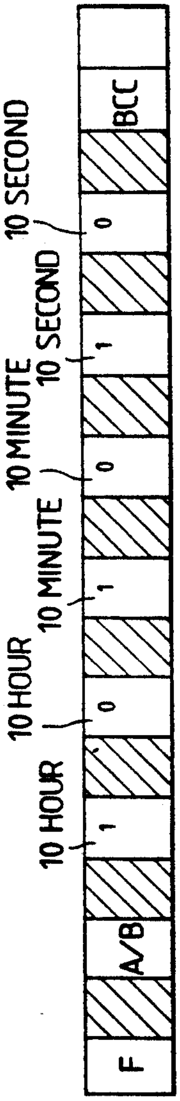
FIG. 7 shows a structure of DTMF signal.

In addition, the audio signal from the audio signal preparing portion 6 is recorded on, for example, an L channel of the audio track of the video tape recorder 16 or on an R channel on which a tone signal of time data produced by the DTMF modulation circuit 11 under control of the control portion 12 is recorded. FIG. 7 shows an example of a construction of the DTFM signal. In FIG. 7, it includes a header portion F followed by an identifier signal A or B indicating stereo mode or monaural mode and time information. Hatched portions in FIG. 7 indicate pause periods.

(7) Manual Check

The automatic CM recognition device shown in FIG. 1 is satisfactory. However, it is impossible to recognize a new CM which has not been included in the master data with the device in FIG. 1. In order to solve this problem, a feature is provided for checking the CM manually.

Figure 8:
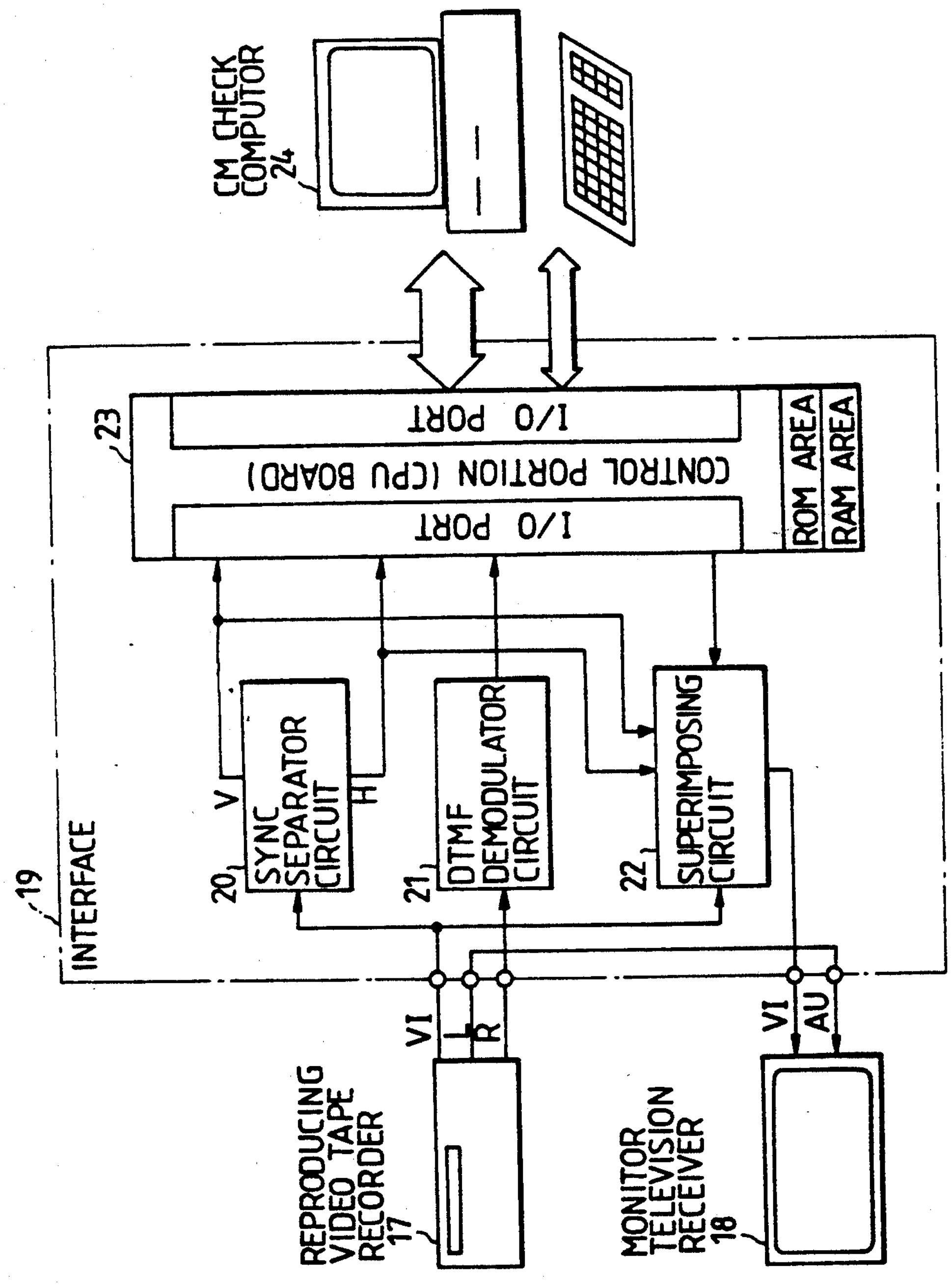
FIG. 8 shows a construction of a check system.

FIG. 8 shows a system construction available for such manual check. This system is provided separately from the automatic CM recognition device shown in FIG. 1 since the latter can not be used for this purpose because it is used continuously during a TV broadcasting period.

In FIG. 8, a recorded video tape made by the recording video tape recorder 16 in FIG. 1 is inserted in a reproducing video tape recorder 17 so that it can be reproduced. In this case, it is not always necessary to reproduce all of the recorded information since it is enough to check portions of a CM which can not be checked by the referencing performed by the CM data referencing computer 14 shown in FIG. 1.

From a video signal VI from the reproducing video tape recorder 17, a vertical synchronizing signal V and a horizontal synchronizing signal H are produced by a sync separator circuit 20 and supplied to a control portion 23, etc. In addition, a DTFM signal indicating time data recorded on the R channel of the audio track is converted by DTFM demodulator circuit 21 into a time data which is supplied to the control portion 23.

The control portion 23 reads from a CM checking computer 24 the referencing result corresponding to the time data given by the DTFM demodulator circuit 21, inserts an instruction message into the video signal VI from the reproducing video tape recorder 17 through a superimpose circuit 22 and displays it on a monitor TV 18. The characters indicating time inserted into the recording are also displayed and the audio signal AU is outputted as it is.

When a CM is a new CM whose master data does not exist, the name of the sponsor, the name of product, etc., of the new CM are included in a CM recognition result with respect to audio data of the new CM by operating a key board of the CM check computer 24 or the like to register it as new master data.

As described hereinbefore, according to the automatic CM recognition device of the present invention, a CM can be automatically derived from a signal received and recognized by comparing it with preliminarily stored master data. Therefore, it is possible to substantially reduce the manpower necessary to perform such CM recognition work and also to improve the reliability of recognition.

What is claimed is:

1. An automatic commercial message (CM) recognition device for checking a CM program in a TV broadcasting signal that has an audio signal having a fixed timing with respect to a video signal thereof, comprising:

a first means responsive to the TV broadcasting signal for detecting a silence state of the audio signal in the TV broadcasting signal at a start time or at an end time of the CM program, said first means including an audio data preparing portion responsive to the audio signal and a vertical synchronizing signal of the video signal for producing audio data of the TV signal, and a silence data preparing portion responsive to said audio data and the vertical synchronizing signal for producing silence data from the audio signal;

second means for detecting a significant change of video signal of the TV broadcasting signal;

third means responsive to outputs of said first means and said second means to derive only the CM program;

fourth means for producing audio data of the TV broadcasting signal by sampling the audio signal with a timing of the vertical synchronizing signal; and fifth means for comparing the CM program derived by said third means with preliminary stored CM data to recognize the CM program.

2. The automatic CM recognition device claimed in claim 1, wherein said second means includes an image change detector portion responsive to the video signal, the vertical synchronizing signal and the horizontal synchronizing signal for detecting a change of image on an image screen from the video signal.

3. The automatic CM recognition device claimed in claim 1, wherein said fifth means includes a control portion for determining a start or end of a CM when an output of said silence data preparing portion indicates a silence state and said second means detects a change of said video signal and a CM data referencing portion cooperating with said control portion for comparing the audio data in a time period from a start to an end of the CM with preliminarily stored audio data of the CM to determine a match between the audio data and the preliminarily stored audio data.

4. The automatic CM recognition device claimed in claim 3, further comprising manual check means for checking a CM and/or preparing master data for the CM when said CM data referencing portion fails to determine the match.

5. The automatic CM recognition device claimed in claim 1, wherein said audio data preparing portion is responsive to the audio signal in a frequency range from 100 to 1000 Hz.

6. The automatic CM recognition device claimed in claim 1, wherein said audio data preparing portion is responsive to the audio signal in a frequency range from 100 to 5000 Hz.

* * * * *